United States Patent
Yoshinaga

(10) Patent No.: US 10,157,113 B2
(45) Date of Patent: Dec. 18, 2018

(54) INFORMATION PROCESSING DEVICE, ANALYSIS METHOD, AND RECORDING MEDIUM

(71) Applicant: NEC Corporation, Minato-ku, Tokyo (JP)

(72) Inventor: Naoki Yoshinaga, Tokyo (JP)

(73) Assignee: NEC CORPORATION, Tokyo (JP)

( * ) Notice: Subject to any disclaimer, the term of this patent is extended or adjusted under 35 U.S.C. 154(b) by 132 days.

(21) Appl. No.: 15/128,531

(22) PCT Filed: May 11, 2015

(86) PCT No.: PCT/JP2015/002365
§ 371 (c)(1),
(2) Date: Sep. 23, 2016

(87) PCT Pub. No.: WO2015/174063
PCT Pub. Date: Nov. 19, 2015

(65) Prior Publication Data
US 2017/0139794 A1    May 18, 2017

(30) Foreign Application Priority Data
May 16, 2014   (JP) ................................ 2014-101948

(51) Int. Cl.
*G06F 11/00*   (2006.01)
*G06F 11/22*   (2006.01)
(Continued)

(52) U.S. Cl.
CPC ...... *G06F 11/2257* (2013.01); *G06F 11/3447* (2013.01); *G06N 99/005* (2013.01); *G06F 11/3409* (2013.01)

(58) Field of Classification Search
CPC ........................... G06F 11/008; G06F 11/2257
(Continued)

(56) References Cited

U.S. PATENT DOCUMENTS

| | | |
|---|---|---|
| 7,975,186 B2 | 7/2011 | Kato |
| 2008/0243912 A1* | 10/2008 | Azvine ................. G06Q 10/06 |
| 2009/0217099 A1 | 8/2009 | Kato |
| 2012/0030522 A1 | 2/2012 | Yabuki |

(Continued)

FOREIGN PATENT DOCUMENTS

| | | |
|---|---|---|
| JP | 4872944 B2 | 2/2012 |
| WO | 2011/155621 A1 | 12/2011 |

(Continued)

OTHER PUBLICATIONS

International Search Report for PCT Application No. PCT/JP2015/002365, dated Jul. 21, 2015.

(Continued)

*Primary Examiner* — Chae M Ko

(57) ABSTRACT

In an invariant relation analysis, a capability to detect abnormalities is improved and erroneous abnormality reports are reduced. A system analysis device (100) includes a correlation model generation unit (130) and a learning reliability calculation unit (140). The correlation model generation unit (130) generates, based on time series of a plurality of metrics in a system in a learning period, a correlation model that includes a correlation between metrics. The learning reliability calculation unit (140) calculates learning reliability of the correlation, based on a behavior of a time series of each of metrics relevant to the correlation included in the correlation model, in the learning period.

12 Claims, 21 Drawing Sheets

(51) Int. Cl.
*G06N 99/00* (2010.01)
*G06F 11/34* (2006.01)

(58) Field of Classification Search
USPC .................................................. 714/1, 26
See application file for complete search history.

(56) References Cited

U.S. PATENT DOCUMENTS

| | | | | |
|---|---|---|---|---|
| 2012/0116850 A1* | 5/2012 | Abe | .................. | G06Q 10/0639 |
| | | | | 705/7.38 |
| 2012/0262604 A1* | 10/2012 | Ishii | .................. | H04N 5/23212 |
| | | | | 348/231.99 |
| 2014/0108640 A1* | 4/2014 | Mathis | .................. | H04L 41/145 |
| | | | | 709/224 |
| 2015/0046060 A1* | 2/2015 | Nikovski | .............. | B60R 16/037 |
| | | | | 701/99 |
| 2017/0076209 A1* | 3/2017 | Sisk | ....................... | G05B 23/00 |

FOREIGN PATENT DOCUMENTS

| | | |
|---|---|---|
| WO | 2012/029500 A1 | 3/2012 |
| WO | 2013/030984 A1 | 3/2013 |
| WO | 2013/111560 A1 | 8/2013 |

OTHER PUBLICATIONS

English translation of Written opinion for PCT Application No. PCT/JP2015/002365.
Miao Jiang et al., "System Monitoring with Metric-Correlation Models", IEEE Transactions on Network and Service Management, vol. 8, No. 4, Dec. 2011, pp. 348-360, XP011389338, ISSN: 1932-4537.
Communication dated Dec. 15, 2017, from European Patent Office in counterpart application No. 15792714.6.

* cited by examiner

Fig. 8

| SINGLE TIME SERIES MODEL | FORMAT |
|---|---|
| LINEAR MODEL | $X(i) = a*i+c$ |
| CONSTANT-VALUE MODEL | $X(i) = a$ |
| TWO-VALUE MODEL | $X(i) = a$ or $b$ |

Fig. 9

| TIME | A | B | C | D |
|---|---|---|---|---|
| 1 | 0.4 | 0.48 | 0.697304 | 0.601075 |
| 2 | 0.9 | 1.08 | 1.348934 | 1.482578 |
| 3 | 1.4 | 1.68 | 2.173732 | 2.217703 |
| 4 | 1.9 | 2.28 | 2.934483 | 2.884976 |
| 5 | 2.4 | 2.88 | 3.529999 | 3.54227 |
| 6 | 2.9 | 3.48 | 3.785225 | 4.115879 |
| 7 | 3.4 | 4.08 | 3.710185 | 4.649527 |
| 8 | 3.9 | 4.68 | 3.275297 | 4.723335 |
| 9 | 4.4 | 5.28 | 2.862558 | 4.217468 |
| 10 | 4.9 | 5.88 | 2.488456 | 3.694272 |
| 11 | 5.4 | 6.48 | 2.112855 | 3.372982 |
| 12 | 5.9 | 7.08 | 1.971109 | 3.171349 |
| 13 | 6.4 | 7.68 | 2.720692 | 4.159434 |
| 14 | 6.9 | 8.28 | 3.469846 | 5.187004 |
| 15 | 7.4 | 8.88 | 4.195488 | 6.011854 |
| 16 | 7.9 | 9.48 | 4.768022 | 6.963083 |
| 17 | 8.4 | 10.08 | 5.618553 | 7.678035 |
| 18 | 8.9 | 10.68 | 6.222811 | 8.837395 |
| 19 | 9.4 | 11.28 | 7.049252 | 9.71483 |
| 20 | 9.9 | 11.88 | 7.666101 | 11.04141 |

Fig. 12

| METRIC | SINGLE TIME SERIES MODEL | | PREDICTION ERROR | PREDICTION ERROR (MINIMUM) | PREDICTION ERROR (TOTAL) (LEARNING RELIABILITY) |
|---|---|---|---|---|---|
| A | LINEAR MODEL | A(i)=0.5*i−0.1 | 0 | 0 | 0 |
| | CONSTANT-VALUE MODEL | : | : | | |
| | TWO-VALUE MODEL | : | : | | |
| B | LINEAR MODEL | B(i)=0.6*i−0.12 | 0 | 0 | |
| | CONSTANT-VALUE MODEL | : | : | | |
| | TWO-VALUE MODEL | : | : | | |

Fig. 13

| METRIC | SINGLE TIME SERIES MODEL | | PREDICTION ERROR | PREDICTION ERROR (MINIMUM) | PREDICTION ERROR (TOTAL) (LEARNING RELIABILITY) |
|---|---|---|---|---|---|
| C | LINEAR MODEL | C(i)=0.2517*i+0.9873 | 1.348 | 1.348 | 2.474 |
| | CONSTANT-VALUE MODEL | : | : | | |
| | TWO-VALUE MODEL | : | : | | |
| D | LINEAR MODEL | D(i)=0.4151*i+0.5547 | 1.126 | 1.126 | |
| | CONSTANT-VALUE MODEL | : | : | | |
| | TWO-VALUE MODEL | : | : | | |

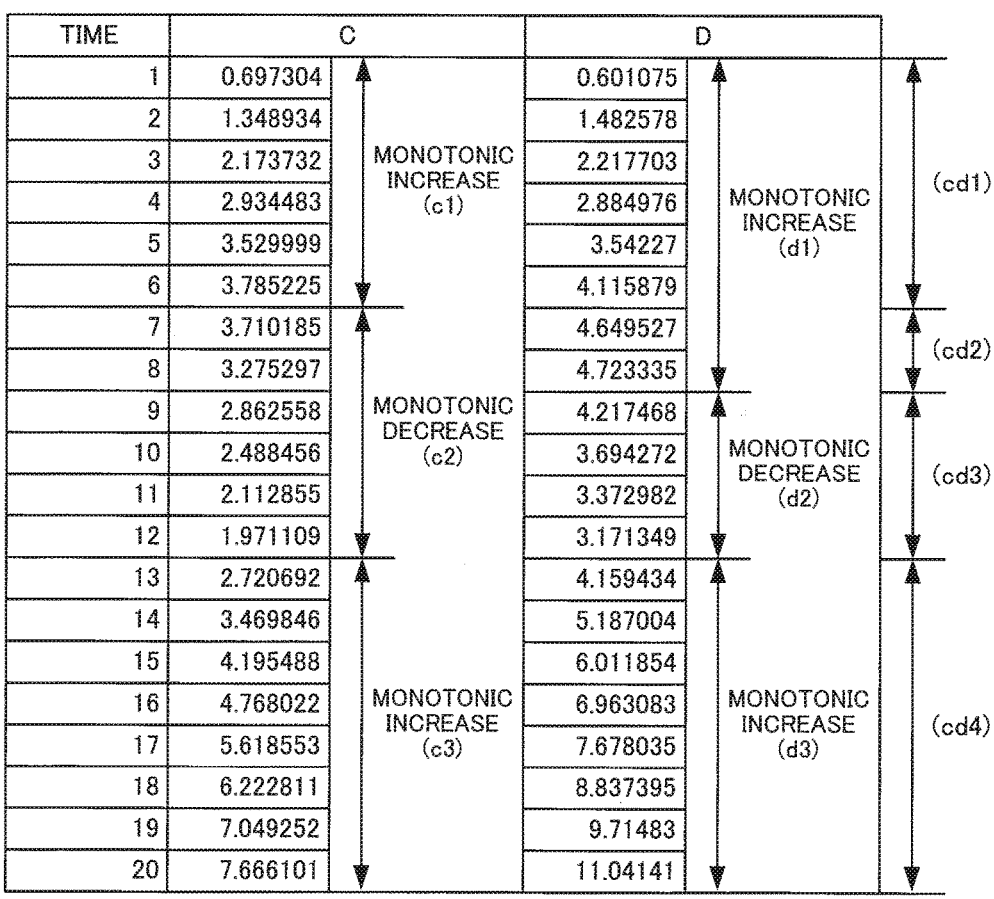

Fig. 16

| METRIC | SEGMENT | SINGLE TIME SERIES MODEL (LINEAR MODEL) |
|---|---|---|
| C | c1 | $C(i)=0.6498*i+0.1373$ |
| | c2 | $C(i)=-0.3588*i+3.9924$ |
| | c3 | $C(i)=0.7077*i+2.0292$ |
| D | d1 | $D(i)=0.6076*i+0.2928$ |
| | d2 | $D(i)=-0.346*i+4.4789$ |
| | d3 | $D(i)=0.9524*i+3.1632$ |

Fig. 17

| SEGMENT | METRIC | SINGLE TIME SERIES MODEL (LINEAR MODEL) | PREDICTION ERROR | PREDICTION ERROR (TOTAL) | PREDICTION ERROR (ALL SEGMENTS TOTAL) (LEARNING RELIABILITY) |
|---|---|---|---|---|---|
| cd1 | C | $C(i) = 0.6498 * i + 0.1373$ | 0.02436 | 0.074223 | 0.165928 |
| cd1 | D | $D(i) = 0.6076 * i + 0.2928$ | 0.049863 | | |
| cd2 | C | $C(i) = -0.3588 * i + 3.9924$ | 0.006343 | 0.056206 | |
| cd2 | D | $D(i) = 0.6076 * i + 0.2928$ | 0.049863 | | |
| cd3 | C | $C(i) = -0.3588 * i + 3.9924$ | 0.006343 | 0.012891 | |
| cd3 | D | $D(i) = -0.346 * i + 4.4789$ | 0.006547 | | |
| cd4 | C | $C(i) = 0.7077 * i + 2.0292$ | 0.002695 | 0.022609 | |
| cd4 | D | $D(i) = 0.9524 * i + 3.1632$ | 0.019914 | | |

Fig. 18

| INPUT | OUTPUT | CORRELATION (CORRELATION FUNCTION) | LEARNING RELIABILITY |
|---|---|---|---|
| C | D | D(i)=1.4454*C(i)−0.3335 | 0.165928 |
| ⋮ | ⋮ | ⋮ | ⋮ |

Fig. 24

| INPUT | OUTPUT | CORRELATION (CORRELATION FUNCTION) | LEARNING RELIABILITY MODEL |
|---|---|---|---|
| A | B | B(i)=1.2*A(i) | ERROR OF LINEAR MODEL ON BOTH METRICS IS 0: LEARNING RELIABILITY = 1<br>ERROR OF LINEAR MODEL ON EITHER ONE OF METRICS IS 0: LEARNING RELIABILITY = 0.5<br>OTHERWISE: LEARNING RELIABILITY = 0 |
| .. | .. | .. | .. |

INFORMATION PROCESSING DEVICE, ANALYSIS METHOD, AND RECORDING MEDIUM

This application is a National Stage Entry of PCT/JP2015/002365 filed on May 11, 2015, which claims priority from Japanese Patent Application 2014-101948 filed on May 16, 2014, the contents of all of which are incorporated herein by reference, in their entirety.

TECHNICAL FIELD

The present invention relates to an information processing device, an analysis method, and a recording medium, and more particularly, to an information processing device, an analysis method, and a recording medium that are used for analyzing a system by using correlations.

BACKGROUND ART

PTL 1 discloses an example operation management system which models a system on the basis of correlativity between time series of system performance, and determines the cause of a fault or abnormality of the system by using the generated model.

The operation management system described in PTL 1 determines a correlation function representing a correlation between any two of a plurality of metrics, based on time-series of actual measured values of the plurality of metrics on the system in a normal state (in a learning period). The operation management system then generates a correlation model of the system by selecting correlations depending on weights that are calculated based on an error of the correlation function. The operation management system further detects destruction of the correlation (correlation destruction) by using the generated correlation model, and then determines the cause of a fault in the system based on the correlation destruction. Such technique for analyzing the state of a system based on correlation destruction is called invariant relation analysis.

For example, with respect to a pair of metrics y and u, the invariant relation analysis uses a correlation function for predicting a value of the metric y from a value of the metric u. The analysis then uses a time series as of the time when the model is generated to calculate a difference, i.e., a prediction error between an actual measured value and a predicted value derived from the correlation function for the metric y. Based on the calculated prediction error, the analysis further sets a threshold of prediction errors to be permitted when the system is monitored. When a prediction error exceeds the threshold during the monitoring (i.e., when correlation destruction is detected), the analysis determines that an abnormality has occurred in the system.

PTL 2, which is another related art, discloses a method for monitoring the state of a facility to detect a system abnormality by using a time series of system performance. According to the method for monitoring the state of a facility, as described in PTL 2, operation pattern labels are given at regular intervals to time-series signals outputted from the facility and a normal model is built for each of the labels. To detect abnormalities, operation pattern labels are given during the detection period to the signals so as to detect abnormality using the normal model that has a label in an identical or closer state.

PTL 3, which is still another related art, discloses a method for extracting a basic model and a specific model from a plurality of correlation models generated during a predetermined period on an operation management system subject to invariant relation analysis, based on degrees of fitness with the performance information in the predetermined period.

CITATION LIST

Patent Literature

[PTL 1] Japanese Patent No. 4872944
[PTL 2] WO 2013/030984
[PTL 3] WO 2012/029500

SUMMARY OF INVENTION

Technical Problem

In the technique described in PTL 1 above, an invariant relation analysis may possibly suffer a decrease in the capability to detect an abnormality or an erroneous abnormality report outputted. This is because a correlation may possibly have a greater weight (a smaller prediction error) even when time series of a metric relevant to the correlation in a learning period may not be enough to learn a relation between metrics. For example, a correlation may have a greater weight even when time-series values of the metric relevant to the correlation are totally unchanged, or change only once, or increase linearly. Selecting such correlation that has not learned sufficiently for the invariant relation analysis may result in a decreased capability to detect an abnormality or in an erroneous abnormality report.

An object of the present invention is to solve the above-described problems, providing an information processing device, an analysis method, and a recording medium for improving a capability to detect abnormalities and reducing erroneous abnormality reports, in an invariant relation analysis.

Solution to Problem

A system analysis device according to an exemplary aspect of the invention includes: a correlation model generation means for generating, based on time series of a plurality of metrics in a system in a learning period, a correlation model that includes a correlation between metrics; and a learning reliability calculation means for calculating learning reliability of the correlation, based on a behavior of a time series of each of metrics relevant to the correlation included in the correlation model, in the learning period.

An analysis method according to an exemplary aspect of the invention includes: generating, based on time series of a plurality of metrics in a system in a learning period, a correlation model that includes a correlation between metrics; and calculating learning reliability of the correlation, based on a behavior of a time series of each of metrics relevant to the correlation included in the correlation model, in the learning period.

A computer readable storage medium according to an exemplary aspect of the invention records thereon a program, causing a computer to perform a method including: generating, based on time series of a plurality of metrics in a system in a learning period, a correlation model that includes a correlation between metrics; and calculating learning reliability of the correlation, based on a behavior of a time series of each of metrics relevant to the correlation included in the correlation model, in the learning period.

Advantageous Effects of Invention

Advantageous effects of the present invention include improving a capability to detect abnormalities and reducing erroneous abnormality reports in an invariant relation analysis.

BRIEF DESCRIPTION OF DRAWINGS

FIG. 8 is a diagram illustrating example formats of a single time series model according to the first exemplary embodiment of the present invention.

FIG. 9 is a diagram illustrating an example of time series of performance information according to the first exemplary embodiment of the present invention.

FIG. 12 is a diagram illustrating an example of learning reliability calculated according to the first exemplary embodiment of the present invention.

FIG. 13 is a diagram illustrating another example of learning reliability calculated according to the first exemplary embodiment of the present invention.

FIG. 14 is a diagram illustrating an example of a correlation model according to the first exemplary embodiment of the present invention.

FIG. 15 is a diagram illustrating an example of time series divided according to a second exemplary embodiment of the present invention.

FIG. 16 is a diagram illustrating examples of single time series models generated according to the second exemplary embodiment of the present invention.

FIG. 17 is a diagram illustrating examples of learning reliability calculated according to the second exemplary embodiment of the present invention.

FIG. 18 is a diagram illustrating an example of a correlation model according to the second exemplary embodiment of the present invention.

FIG. 24 is a diagram illustrating an example of a correlation model according to the third exemplary embodiment of the present invention.

DESCRIPTION OF EMBODIMENTS

First Exemplary Embodiment

A first exemplary embodiment of the present invention will be described.

Figure 2:
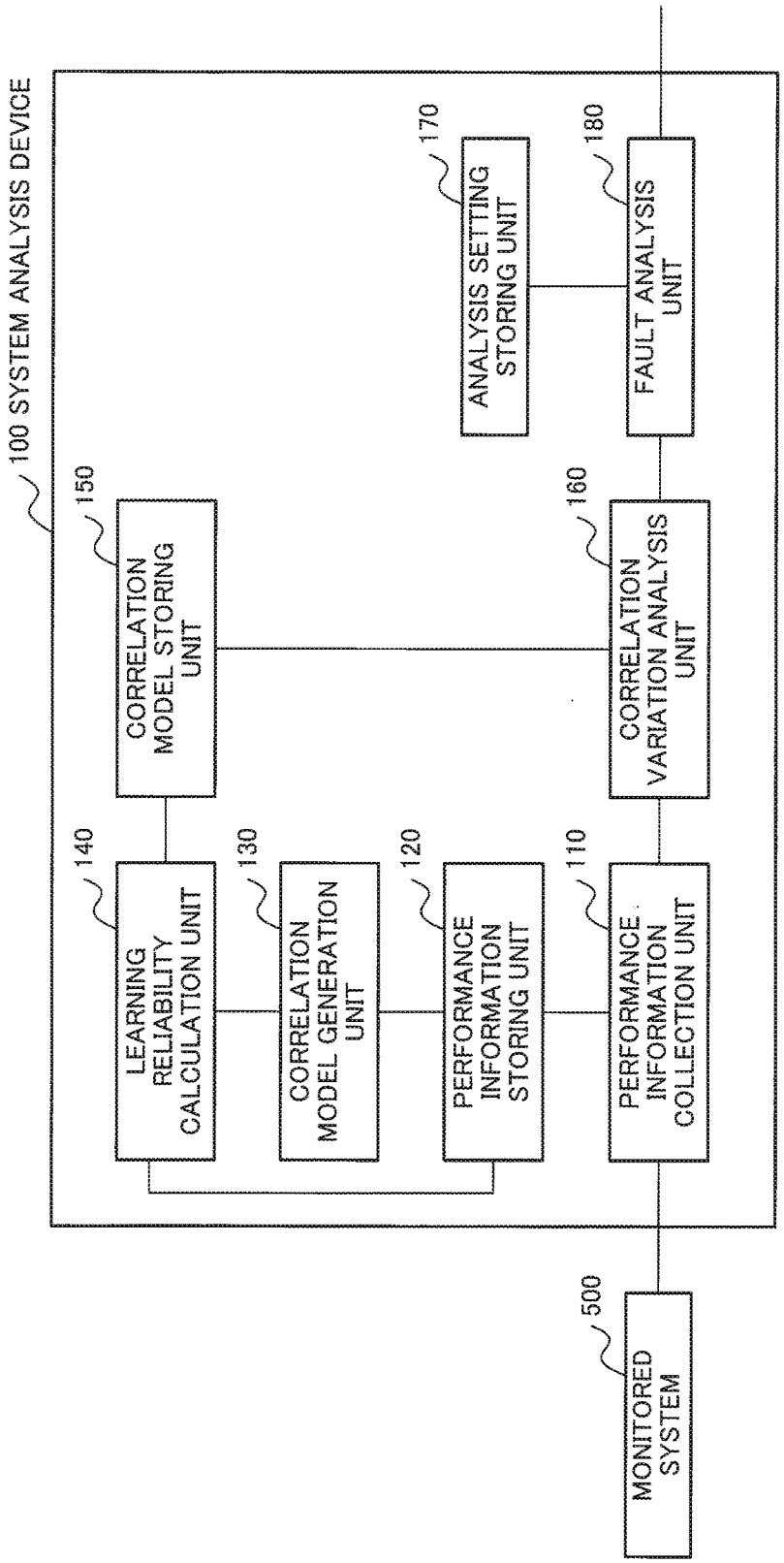
FIG. 2 is a block diagram illustrating a configuration of a system analysis device 100 according to the first exemplary embodiment of the present invention.

Firstly, a configuration according to the first exemplary embodiment of the present invention is described. FIG. 2 is a block diagram illustrating a configuration of a system analysis device 100 according to the first exemplary embodiment of the present invention. The system analysis device 100 constitutes an exemplary embodiment of an information processing device according to the present invention.

With reference to FIG. 2, the system analysis device 100 according to the first exemplary embodiment of the present invention is connected to a monitored system 500 via a network or the like. Examples of the monitored system 500 may include systems providing information and communication services such as Web services or business operation services, as well as systems such as plants or power-generating facilities. The monitored system 500 outputs time-series actual measured values of system performance.

The monitored system 500 takes actual measurements for a plurality of items of performance values at regular intervals, and sends the measured values to the system analysis device 100. Examples of the items of performance values may include usage rates and usage amounts of computer resources and network resources, such as usage rates of a central processing unit (CPU), usage rates of a memory, and frequencies of disk access. The items of performance values may also include power, voltage, current, temperature, and pressure that are measured through a variety of sensors.

An item of a performance value is herein defined as a metric (performance index), while a set of values of a plurality of metrics measured at the same time is defined as performance information. Metric values are represented by integers, decimals, or other numerals. A metric corresponds to an "element", with respect to which a correlation model is generated according to PTL 1.

The system analysis device 100 generates a correlation model for the monitored system 500 based on time series of performance information collected by the monitored system 500, and analyzes the state of the monitored system 500 using the generated correlation model.

The system analysis device 100 includes a performance information collection unit 110, a performance information storing unit 120, a correlation model generation unit 130, a learning reliability calculation unit 140, a correlation model storing unit 150, a correlation variation analysis unit 160, an analysis setting storing unit 170, and a fault analysis unit 180.

The performance information collection unit 110 collects a time series of performance information from the monitored system 500.

The performance information storing unit 120 stores the time series of performance information collected by the performance information collection unit 110 in a learning period.

As with PTL 1, the correlation model generation unit 130 generates a correlation model of the monitored system 500 on the basis of time series of performance information in the learning period.

The correlation model includes a correlation between every two of a plurality of metrics. The correlation herein is represented by a correlation function (or transform function) between metrics. The correlation function is a function that predicts, from a value of one metric (input metric) of a pair of metrics, a value of the other metric (output metric).

The correlation model generation unit 130 calculates parameters of the correlation function for every pair of metrics, by using the time series of performance information in the learning period stored in the performance information collection unit 110. As with PTL 1, the parameters of a correlation function are determined through a system identification process performed on time series of metrics. The correlation model generation unit 130 generates a correlation model by repeating these processes on every pair of metrics. As with PTL 1, the correlation model generation unit 130 may calculate a weight depending on a prediction error of the correlation function and give the weight to the correlation. In addition, the correlation model generation unit 130 may select some correlations based on such weights.

The learning reliability calculation unit 140 calculates learning reliability of a correlation included in the correlation model, by using the time series of performance information in the learning period stored in the performance information collection unit 110. The learning reliability herein indicates whether a correlation has learned a relation between metrics.

In the exemplary embodiment of the present invention, it is assumed that a correlation has not sufficiently learned an actual relation between metrics and thus the learning reliability of the correlation is low, if a specific behavior is seen in the time series of each metric relevant to the correlation, in the learning period. A specific behavior herein refers to behaviors of the time series of a metric including: showing a constant value, showing either of two values, or showing a linear change.

For example, if a time series of a metric relevant to a correlation in the learning period increases linearly, this indicates that the correlation has only learned a relation between metrics in such circumstance. Thus, when the metric shows a decrease or a repetitive "increase and decrease" in values, a correlation variation analysis is highly likely to determine that the behavior is abnormal (and to output a wrong abnormality report) even though the behavior is actually normal.

For this reason, according to the exemplary embodiment of the present invention, a time series model (a single time series model) indicating a specific behavior as described above is generated, based on a time series of each metric relevant to a correlation in the learning period. Then, based on a degree of fitness of the single time series model with the time series of a metric in the learning period, learning reliability is calculated. The learning reliability herein depends on the degree of fitness. That is, the learning reliability is calculated to be a lower value for a higher degree of fitness, while it is calculated to be a higher value for a lower degree of fitness.

In addition, according to the exemplary embodiment of the present invention, the degree of fitness is calculated by using a prediction error of the single time series model, for the time series of each metric in the learning period. In this case, the learning reliability depends on the prediction error of the single time series model. That is, the learning reliability is calculated to be a lower value for a smaller prediction error (a higher degree of fitness), while it is calculated to be a higher value for a greater prediction error (a lower degree of fitness).

The correlation model storing unit 150 stores correlations included in the correlation model generated by the correlation model generation unit 130, by adding thereto the learning reliability calculated by the learning reliability calculation unit 140.

The correlation variation analysis unit 160 obtains the correlation model along with the added learning reliability from the correlation model storing unit 150, and then extracts a correlation whose learning reliability is equal to or more than a predetermined threshold. If a weight is added to the correlation model, the correlation variation analysis unit 160 may extract the correlation by additionally considering the weight. With respect to every extracted correlation, the correlation variation analysis unit 160 detects correlation destruction, by calculating a prediction error of a correlation function using time series of performance information in a period (monitoring period) subject to the correlation variation analysis.

The analysis setting storing unit 170 stores analysis settings that define methods and conditions of the fault analysis to be conducted by the fault analysis unit 180. For example, the analysis settings may define conditions related to the number or rate of correlation destruction, which is used, by the fault analysis unit 180, for a notification of abnormalities (i.e., issuing warnings).

The fault analysis unit 180 conducts a fault analysis according to the analysis settings.

Figure 3:
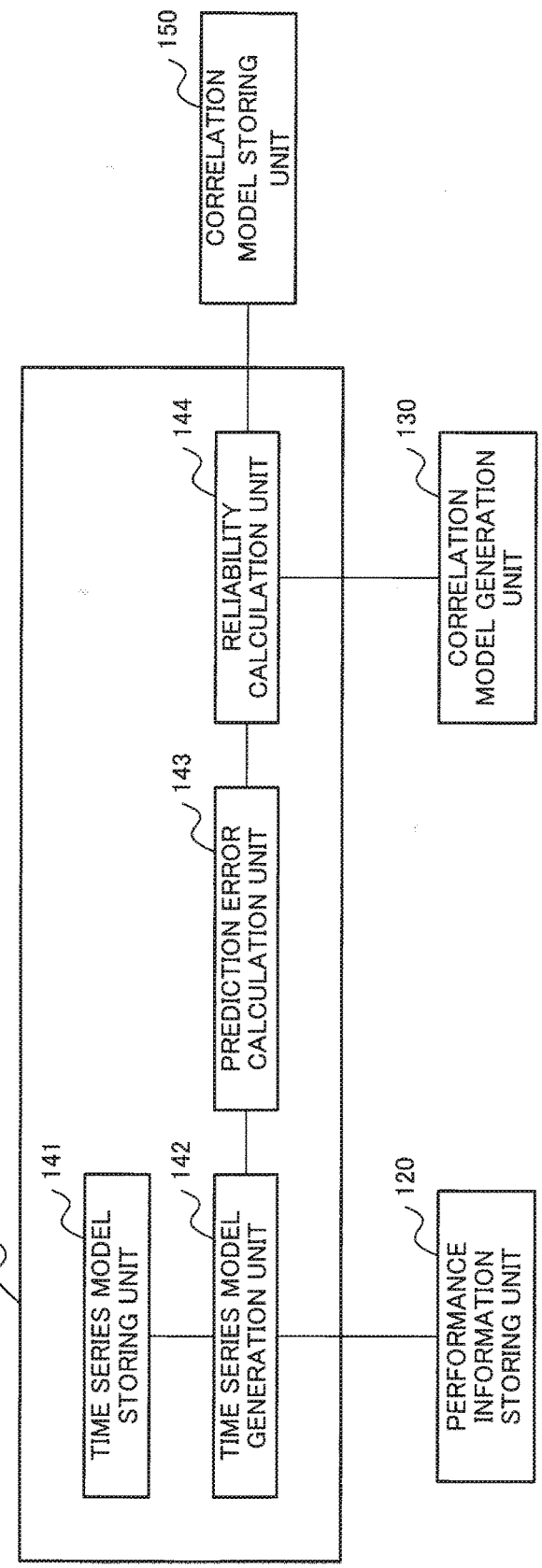
FIG. 3 is a block diagram illustrating a configuration of a learning reliability calculation unit 140 according to the first exemplary embodiment of the present invention.

FIG. 3 is a block diagram illustrating a configuration of the learning reliability calculation unit 140 according to the first exemplary embodiment of the present invention.

With reference to FIG. 3, the learning reliability calculation unit 140 includes a time series model storing unit 141, a time series model generation unit 142, a prediction error calculation unit 143, and a reliability calculation unit 144.

The time series model storing unit 141 stores formats of a single time series model. The single time series model is a time series model for modeling the time series of each metric. As the single time series model, a time series model indicating a behavior for which learning reliability of a correlation is deemed to be low is used.

FIG. 8 is a diagram illustrating example formats of a single time series model according to the first exemplary embodiment of the present invention. In the example in FIG. 8, a constant-value model, a two-value model, and a linear model are defined as formats of the single time series model. In FIG. 8, X(i) represents a value of metric X as of the time i, while a, b, and c are parameters.

The time series model generation unit 142 determines parameters of a single time series model in each of the formats stored in the time series model storing unit 141 (i.e., generates a single time series model), based on time series of each metric in a learning period. Parameters of the single time series model may be determined through, for example, a system identification process on the time series of the metric.

The prediction error calculation unit 143 calculates a prediction error of the single time series model, as a degree of fitness of the single time series model with the time series of each metric in the learning period. The prediction error may be calculated by, for example, obtaining a root mean square of differences between actual measured values and predicted values that are obtained by applying the time series in the learning period to the single time series model.

The reliability calculation unit 144 calculates learning reliability of a correlation. The reliability calculation unit 144 determines the learning reliability of the correlation to be a smaller value for a higher degree of fitness (a smaller prediction error) of the single time series model generated for each metric relevant to the correlation.

For example, the reliability calculation unit 144 extracts the smallest prediction error from prediction errors of a plurality of single time series models that have been calculated for each metric relevant to the correlation. The reliability calculation unit 144 then determines the learning reliability of the correlation by calculating the sum of prediction errors that have been extracted for each of the metrics relevant to the correlation.

The first exemplary embodiment of the present invention employs a prediction error of a single time series model as the degree of fitness of the single time series model. However, anything other than prediction errors may be used as long as it can represent the degree of fitness of the single time series model with a time series in a learning period. For example, if the single time series model is a constant-value or two-value model, the number of occurrences of a value other than the constant value or the two values may be used as the degree of fitness. In this case, the method of calculating the degree of fitness of a single time series model may be added to the formats of respective single time series models stored in the time series model storing unit 141.

The system analysis device 100 may be a computer that includes a CPU and a storage medium storing programs and operates according to controls based on the programs. The performance information storing unit 120, the correlation model storing unit 150, and the analysis setting storing unit 170 may be separate storage media or may together constitute a single storage medium.

Figure 4:
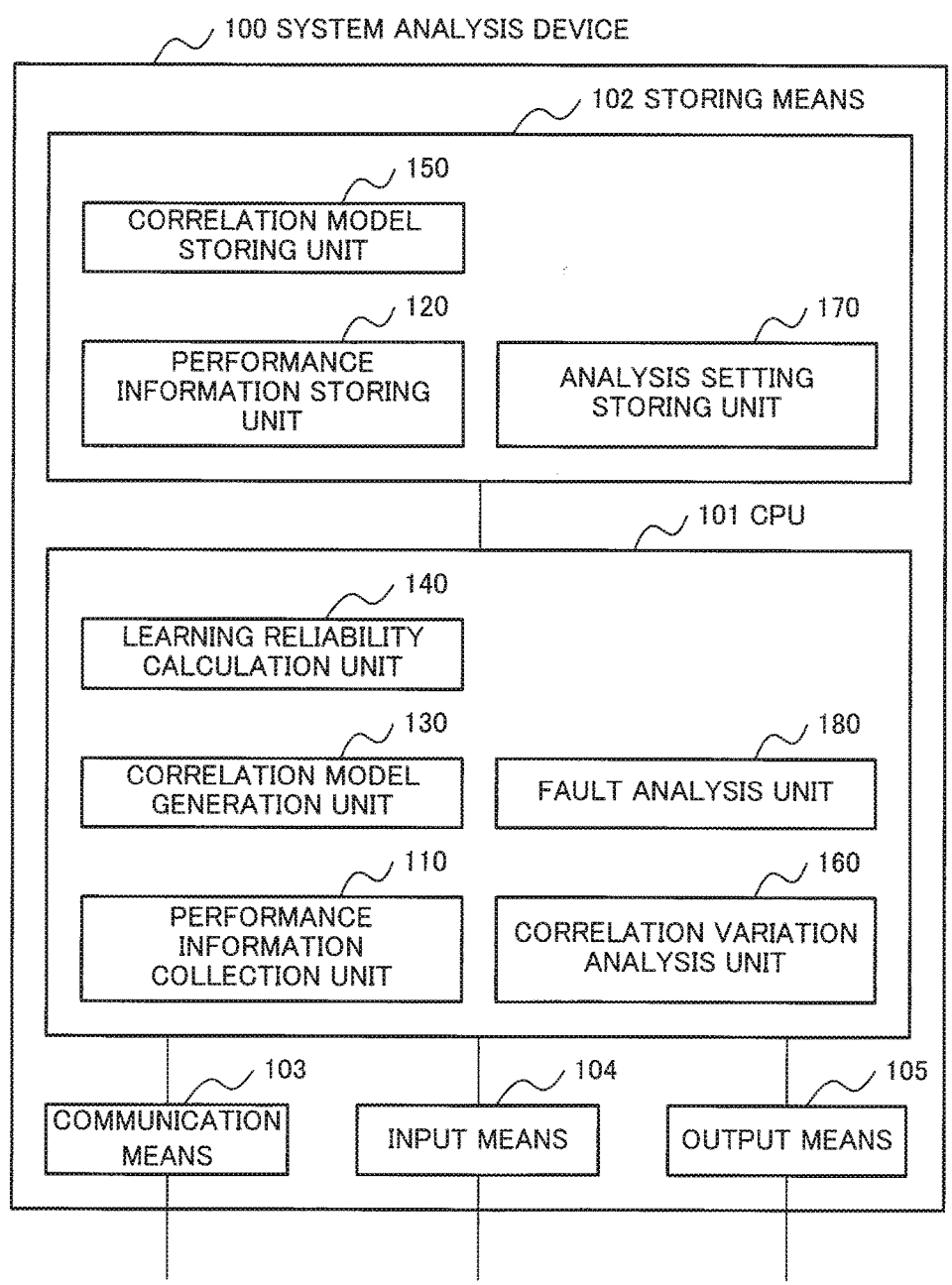
FIG. 4 is a block diagram illustrating a configuration of the system analysis device 100 implemented by a computer according to the first exemplary embodiment of the present invention.

FIG. 4 is a block diagram illustrating a configuration of the system analysis device 100 implemented by a computer according to the first exemplary embodiment of the present invention. The system analysis device 100 includes a CPU 101, a storing means (storing medium) 102 such as a hard disk or memory, a communication means 103 for data communications with other devices or apparatuses, an input means 104 such as a keyboard, and an output means 105 such as a display.

The CPU 101 executes the computer programs for implementing functions of the performance information collection unit 110, the correlation model generation unit 130, the learning reliability calculation unit 140, the correlation variation analysis unit 160, and the fault analysis unit 180. The storing means 102 stores data for the performance information storing unit 120, the correlation model storing unit 150, and the analysis setting storing unit 170. The communication means 103 receives a time series of performance information from the monitored device 500. The input means 104 receives various thresholds and analysis settings inputted by a user or the like. The output means 105 outputs results of the fault analysis to the user or the like.

Individual components of the system analysis device 100 illustrated in FIG. 2 may be independent logic circuits.

The operation of the system analysis device 100 according to the first exemplary embodiment of the present invention will be described.

Figure 5:
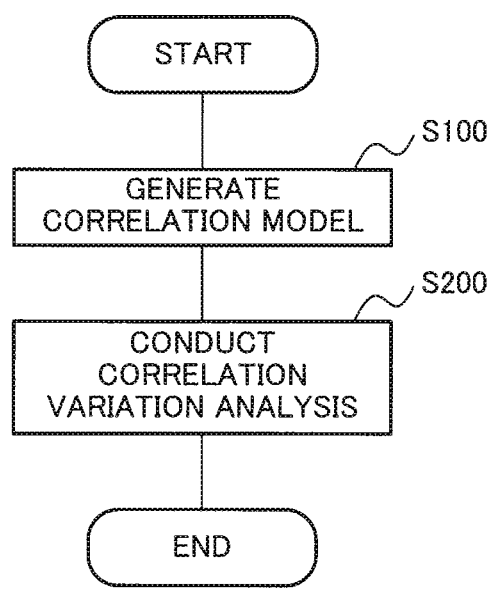
FIG. 5 is a flow chart illustrating entire processes performed by the system analysis device 100 according to the first exemplary embodiment of the present invention.

FIG. 5 is a flow chart illustrating entire processes performed by the system analysis device 100 according to the first exemplary embodiment of the present invention.

First, the system analysis device 100 generates a correlation model (Step S100). Then, the system analysis device 100 conducts a correlation variation analysis (invariant relation analysis) using the generated correlation model (Step S200).

Figure 6:
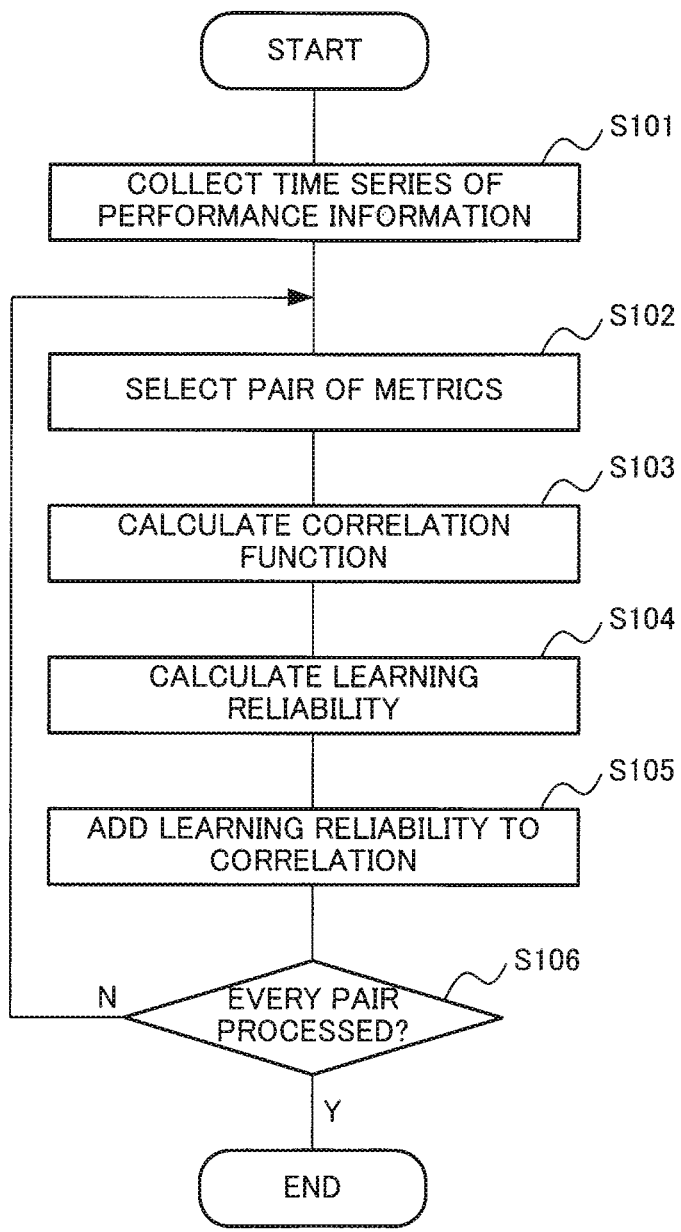
FIG. 6 is a flow chart illustrating details of a correlation model generation process (Step S100) according to the first exemplary embodiment of the present invention.

FIG. 6 is a flow chart illustrating details of the correlation model generation process (Step S100) according to the first exemplary embodiment of the present invention.

The following description assumes that a format of correlation function, $Y(i)=a*X(i)+b$, where a and b are parameters and i is a time, is used for representing the correlation between metrics X and Y.

First, the performance information collection unit 110 collects a time series of performance information in a learning period from the monitored system 500 (Step S101). The performance information collection unit 110 stores the collected time series of performance information into the performance information storing unit 120.

FIG. 9 is a diagram illustrating an example of a time series of performance information according to the first exemplary embodiment of the present invention.

For example, the performance information collection unit 110 collects and stores the time series of metrics A, B, C, and D as illustrated in FIG. 9, as a time series of performance information.

The correlation model generation unit 130 selects a pair of metrics from the performance information stored in the performance information collection unit 110 (Step S102). The correlation model generation unit 130 calculates a correlation function for the selected pair of metrics, using the time series in the learning period (Step S103).

Figure 10:
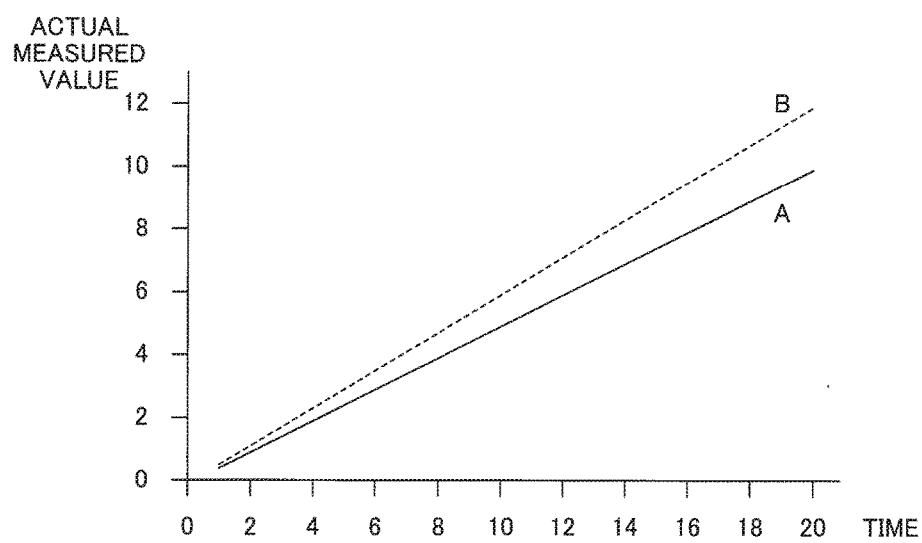
FIG. 10 is a graph representing a time series of metrics A and B in FIG. 9.

FIG. 10 is a graph representing the time series of metrics A and B in FIG. 9.

The correlation model generation unit 130 calculates a correlation function between metrics A and B for the time series shown in FIG. 9 as, for example, $B(i)=1.2*A(i)$ by using the method of least squares.

The learning reliability calculation unit 140 calculates learning reliability of the correlation (Step S104). In this step, the time series model generation unit 142 in the learning reliability calculation unit 140 generates a single time series model for each of the formats stored in the time series model storing unit 141, with respect to the time series of each metric relevant to the correlation, in the learning period. The prediction error calculation unit 143 calculates a prediction error of each single time series model for the time series in the learning period. The reliability calculation unit 144 extracts the smallest prediction error from prediction errors of single time series models that have been calculated for each metric. The reliability calculation unit 144 then determines the learning reliability of the correlation, by calculating the sum of prediction errors that have been extracted for individual metrics.

FIG. 12 is a diagram illustrating an example of learning reliability calculated according to the first exemplary embodiment of the present invention.

For example, the learning reliability calculation unit 140 generates single time series models for each of metrics A and B in the time series illustrated in FIG. 9, and determines learning reliability of the correlation between metrics A and B to be "0" by calculating the sum of prediction errors (minimum values) of the single time series models as illustrated in FIG. 12.

The learning reliability calculation unit 140 adds the learning reliability to the correlation, and stores them into the correlation model storing unit 150 (Step S105).

FIG. 14 is a diagram illustrating an example of the correlation model according to the first exemplary embodiment of the present invention.

For example, the learning reliability calculation unit 140 adds the learning reliability to the correlation between metrics A and B as illustrated in FIG. 14, and stores them.

Subsequently, Steps S102 to S105 are repeated for every pair of metrics (Step S106).

Figure 11:
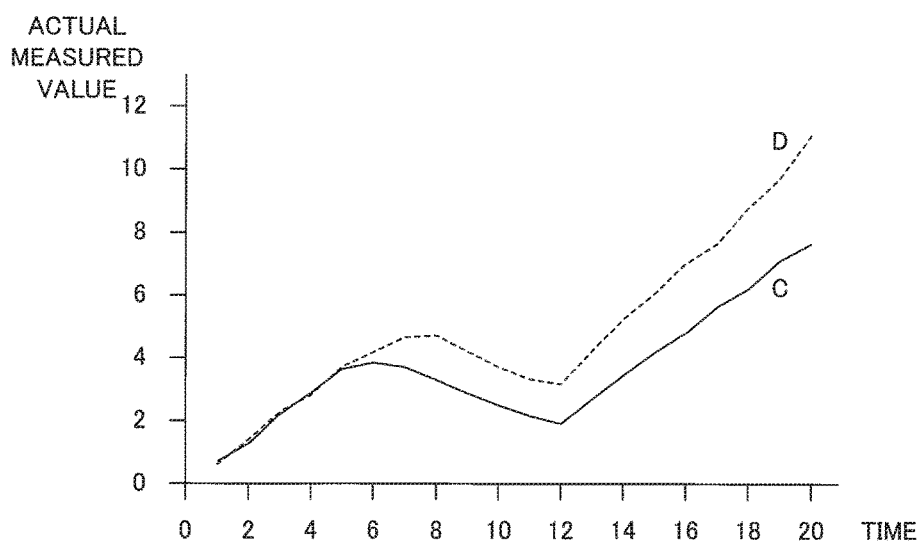
FIG. 11 is a graph representing a time series of metrics C and D in FIG. 9.

FIG. 11 is a graph representing the time series of metrics C and D in FIG. 9.

The correlation model generation unit 130 calculates a correlation function between metrics C and D in the time series in FIG. 9 as, for example, $D(i)=1.4454*C(i)-0.3335$.

FIG. 13 is a diagram illustrating another example of learning reliability calculated according to the first exemplary embodiment of the present invention.

The learning reliability calculation unit 140 generates a single time series model for each of metrics C and D in the time series in FIG. 9 as illustrated in FIG. 13, and calculates learning reliability of the correlation between metrics C and D as "2.474".

The learning reliability calculation unit 140 adds the learning reliability to the correlation between metrics C and D as illustrated in FIG. 14, and stores them.

Figure 7:
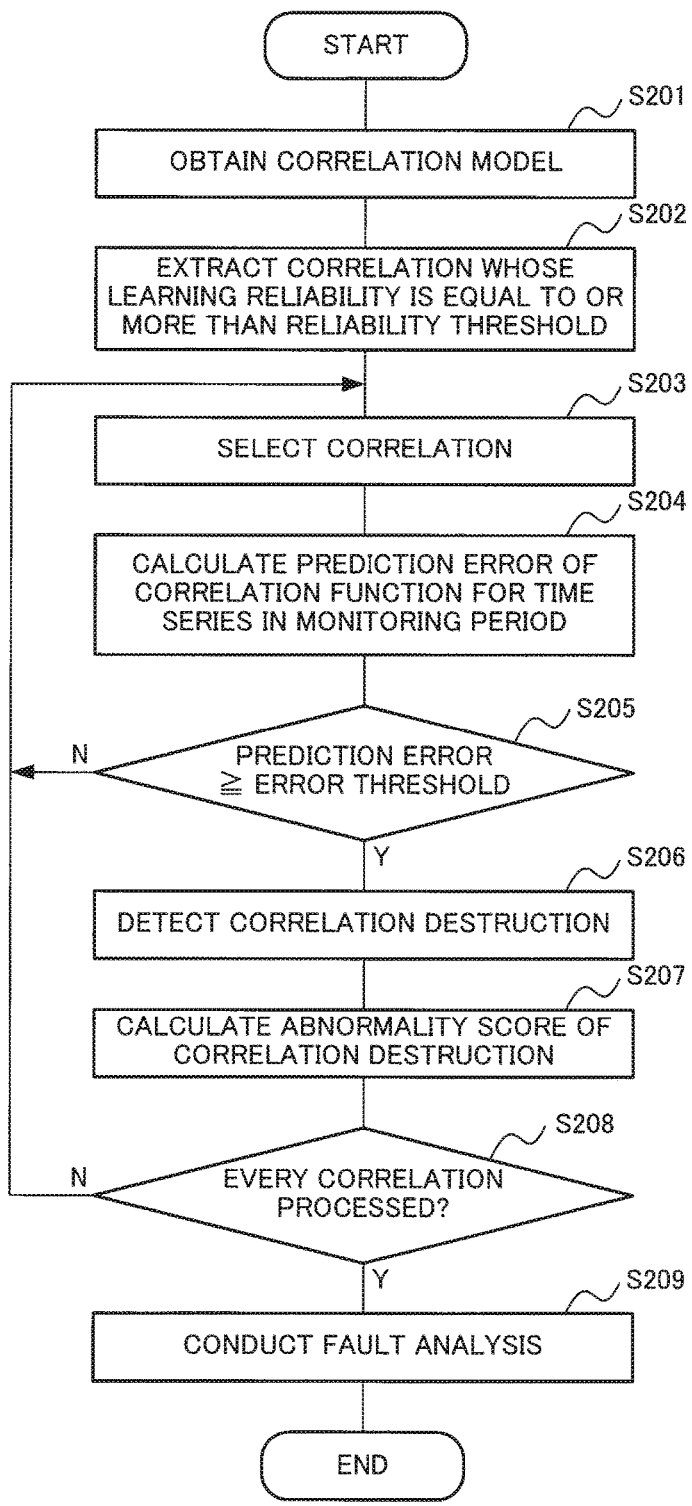
FIG. 7 is a flow chart illustrating details of a correlation variation analysis process (Step S200) according to the first exemplary embodiment of the present invention.

FIG. 7 is a flow chart illustrating details of the correlation variation analysis process (Step S200) according to the first exemplary embodiment of the present invention.

First, the correlation variation analysis unit 160 obtains the correlation model that includes added learning reliability from the correlation model storing unit 150 (Step S201). From the correlation model, the correlation variation analysis unit 160 extracts a correlation whose learning reliability is equal to or more than a predetermined reliability threshold (Step S202).

For example, if the reliability threshold is 0.1, the correlation variation analysis unit 160 extracts the correlation between metrics C and D having learning reliability of 2.474 from the correlation models in FIG. 14. The correlation between metrics A and B is not extracted.

The correlation variation analysis unit 160 selects one of the correlations that have been extracted in Step S202 (Step S203).

The correlation variation analysis unit 160 calculates a prediction error of the selected correlation for a time series of performance information collected by the performance information collection unit 110 in a monitoring period (Step S204).

If the prediction error is equal to or more than a predetermined error threshold (Y in Step S205), the correlation variation analysis unit 160 determines that correlation destruction has been detected (Step S206), and then calculates an abnormality score of the correlation destruction (Step S207).

The correlation variation analysis unit 160 repeats the processes in Steps S203 to S207 for every correlation that has been extracted in Step S202 (Step S208).

For example, the correlation variation analysis unit 160 detects correlation destruction for the correlation between metrics C and D extracted in Step S202, by using the time series in the monitoring period.

Finally, the fault analysis unit 180 conducts a fault analysis according to the analysis settings stored in the analysis setting storing unit 170 (Step S209). The fault analysis unit 180 outputs details of the detected correlation destruction or results of the fault analysis toward the user or the like.

By carrying out the above, the operation according to the first exemplary embodiment of the present invention is completed.

Figure 1:
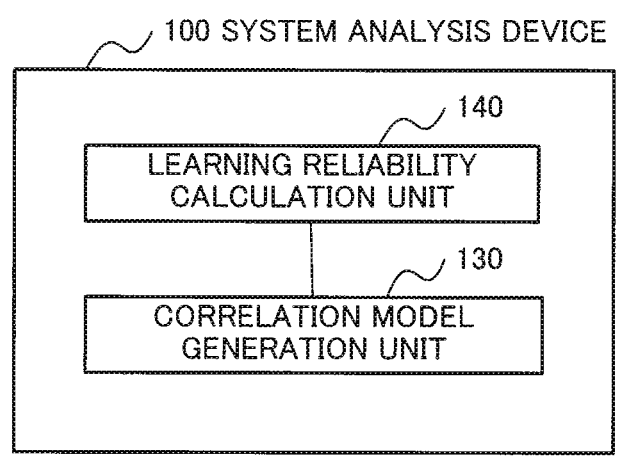
FIG. 1 is a block diagram illustrating a characteristic configuration of a first exemplary embodiment of the present invention.

Next, a characteristic configuration of the first exemplary embodiment of the present invention will be described. FIG. 1 is a block diagram illustrating a characteristic configuration of the first exemplary embodiment of the present invention.

Referring to FIG. 1, a system analysis device 100 includes a correlation model generation unit 130 and a learning reliability calculation unit 140. The correlation model generation unit 130 generates, based on time series of a plurality of metrics in a system in a learning period, a correlation model that includes a correlation between metrics. The learning reliability calculation unit 140 calculates learning reliability of the correlation, based on a behavior of a time series of each of metrics relevant to the correlation included in the correlation model, in the learning period.

According to the first exemplary embodiment of the present invention, a capability to detect abnormalities can be improved and erroneous fault reports can be reduced, in an invariant relation analysis. This is because the learning reliability calculation unit 140 calculates learning reliability of a correlation that is included in a correlation model, based on a behavior of time series of each of metrics relevant to the correlation in a learning period. As a result, the invariant relation analysis can be conducted with a correlation having a high learning reliability.

A method of selecting a model based on labels, like a technique described in PTL 2 above, makes it possible to select a model in a system depending on a detection period. However, since labels are added to the system, the method fails to select a suitable correlation when a model includes a plurality of correlations relevant to the system, like a correlation model used for an invariant relation analysis.

According to the first exemplary embodiment of the present invention, a suitable correlation can be selected from a plurality of correlations included in the correlation model of the system to conduct the invariant relation analysis. This is because the learning reliability calculation unit 140 calculates learning reliability of every correlation included in the correlation model.

Second Exemplary Embodiment

A second exemplary embodiment of the present invention will be described.

The second exemplary embodiment of the present invention is different from the first exemplary embodiment in that a time series of performance information is divided in the direction of time and learning reliability is calculated based on the divided time series.

According to the second exemplary embodiment of the present invention, the time series model generation unit 142 in the learning reliability calculation unit 140 divides a time series of each metric relevant to a correlation in a learning period into segments (first division), and generates a single time series model for each of the separate segments provided by the first division.

The first division is performed by selecting a combination from combinations of every possible division and single time series models generated for respective segments of the divided time series, in such a way that the sum of prediction errors of the single time series models is minimized. For example, suppose that a linear model is used as the single time series model and the time series of a metric shows a monotonic increase and a monotonic decrease. Then, the time series is divided into segments each of which represents either of the monotonic increase and the monotonic decrease.

FIG. 15 is a diagram illustrating an example of time series divided according to the second exemplary embodiment of the present invention.

For example, the time series model generation unit 142 divides the time series of metric C in FIG. 9 into three segments as illustrated in FIG. 15: a segment from time 1 to time 6 (Segment c1), a segment from time 7 to time 12 (Segment c2), and a segment from time 13 to time 20 (Segment c3). Likewise, the time series model generation unit 142 divides the time series of metric D into three segments: a segment from time 1 to time 8 (Segment d1), a segment from time 9 to time 12 (Segment d2), and a segment from time 13 to time 20 (Segment d3).

FIG. 16 is a diagram illustrating examples of single time series models generated according to the second exemplary embodiment of the present invention.

As illustrated in FIG. 16, the time series model generation unit 142 generates a single time series model for each of the separate segments of metrics C and D (c1, c2, c3, d1, d2, and d3).

Note that an upper limit may be imposed on the number of segments into which a time series is divided.

The prediction error calculation unit 143 further divides the segments provided by the first division in such a way that the time series of both metrics are divided at time points used for dividing the time series of either metric (second division).

For example, the prediction error calculation unit 143 divides the time series of metrics C and D into four segments as illustrated in FIG. 15: a segment from time 1 to time 6 (Segment cd1), a segment from time 7 to time 8 (Segment cd2), a segment from time 9 to time 12 (Segment cd3), and a segment from time 13 to time 20 (Segment cd4).

The prediction error calculation unit 143 assigns a combination of single time series models to every segment provided by the second division, and calculates prediction errors of the assigned single time series models. The reliability calculation unit 144 then determines learning reliability of the correlation, by calculating the sum of prediction errors calculated for individual segments.

FIG. 17 is a diagram illustrating examples of learning reliability calculated according to the second exemplary embodiment of the present invention.

For example, as illustrated in FIG. 17, the prediction error calculation unit 143 assigns a combination of single time series models to each of the segments (cd1, cd2, cd3, and cd4), and calculates prediction errors of the single time series models. The reliability calculation unit 144 determines the learning reliability of the correlation between metrics C and D to be "0.165928", by calculating the sum of the prediction errors obtained for individual segments.

The learning reliability calculation unit 140 adds the learning reliability to the correlation, and stores them into the correlation model storing unit 150.

FIG. 18 is a diagram illustrating an example of a correlation model according to the second exemplary embodiment of the present invention.

For example, the reliability calculation unit 144 adds the learning reliability to the correlation between metrics C and D as illustrated in FIG. 18, and stores them.

According to the second exemplary embodiment of the present invention, the first division is made on the time series of each metric relevant to a correlation, followed by the second division where time series of both metrics are divided at time points used for dividing the time series of either metric. Then, the learning reliability is determined by calculating the sum of prediction errors that have been calculated for individual segments provided by the second division. However, this is not the only way of calculating learning reliability. For example, the second division may be omitted, and the learning reliability may be determined by calculating the sum of prediction errors that have been calculated for individual segments provided by the first division.

According to the second exemplary embodiment of the present invention, it is possible to calculate learning reliability even when behaviors of a time series of a metric in a learning period fit with different single time series models at different times. This is because the learning reliability calculation unit 140 divides, in the direction of time, the time series of each metric relevant to a correlation in a learning period, and calculates the learning reliability based on degrees of fitness of single time series models with the individual segments into which the time series has been divided.

Third Exemplary Embodiment

A third exemplary embodiment of the present invention will be described.

The third exemplary embodiment of the present invention is different from the first exemplary embodiment in that learning reliability is calculated based on a degree of fitness of a single time series model with a time series in a learning period and a degree of fitness of the single time series model with a time series in a monitoring period.

Figure 19:
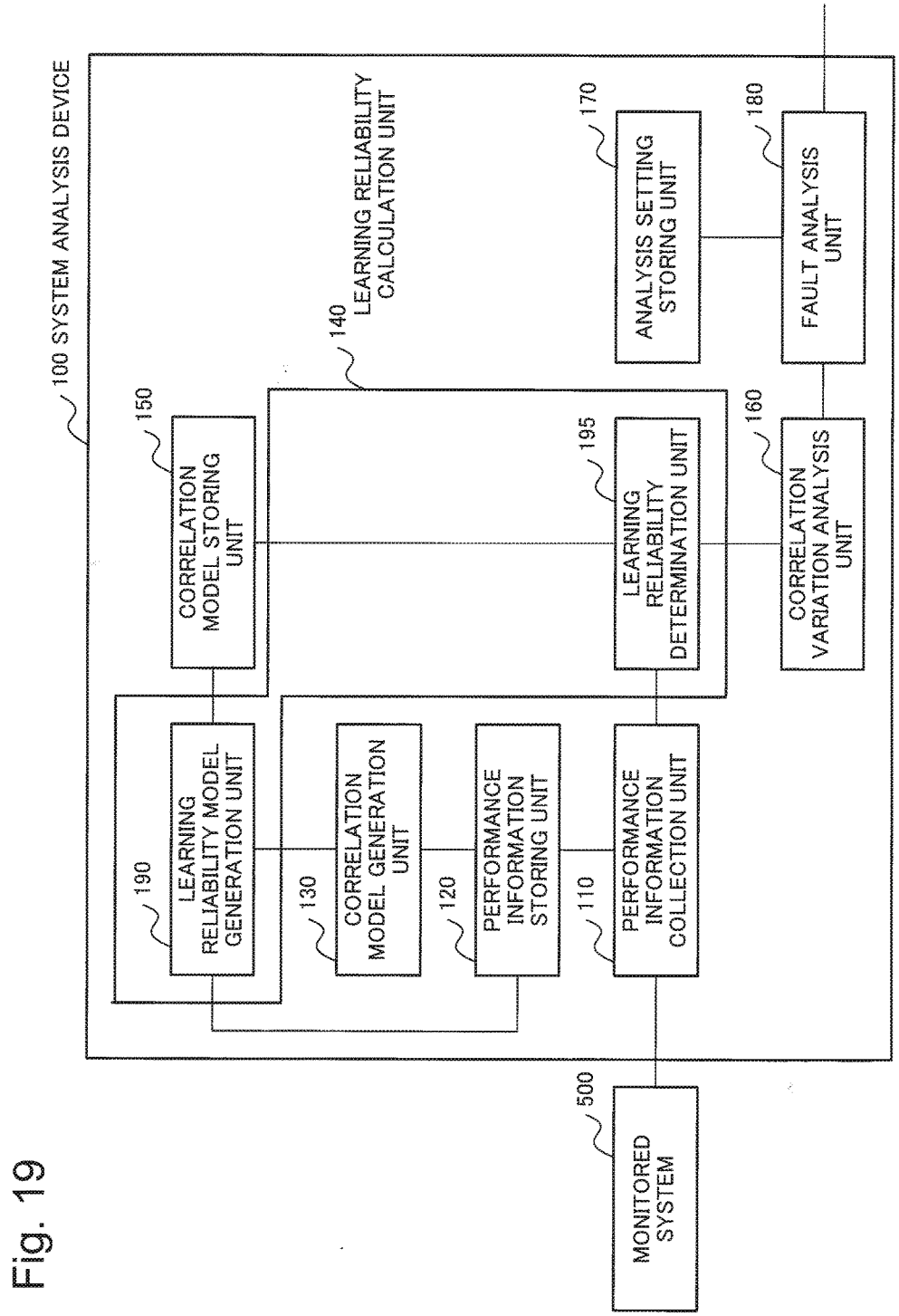
FIG. 19 is a block diagram illustrating a configuration of a system analysis device 100 according to a third exemplary embodiment of the present invention.

Firstly, a configuration according to the third exemplary embodiment of the present invention is described. FIG. 19 is a block diagram illustrating a configuration of a system analysis device 100 according to the third exemplary embodiment of the present invention.

With reference to FIG. 19, the learning reliability calculation unit 140 in the system analysis device 100 according to the third exemplary embodiment of the present invention includes a learning reliability model generation unit 190 and a learning reliability determination unit 195.

The learning reliability model generation unit 190 generates a learning reliability model of a correlation included in a correlation model, by using a time series of performance information in a learning period, which is stored in the performance information collection unit 110. The learning reliability model indicates how learning reliability is determined based on a time series of performance information in a monitoring period.

In the third exemplary embodiment of the present invention, it is further assumed that a correlation has sufficiently learned a relation between metrics in the monitoring period and thus the learning reliability of the correlation is high, if time series of a metric relevant to the correlation shows the same behavior both in the learning period and in the monitoring period.

Thus, the third exemplary embodiment of the present invention generates a learning reliability model in such a way that a greater value is given to the learning reliability if the degree of fitness of a single time series model with the time series in the learning period is high, and the degree of fitness of a single time series model with the time series in the monitoring period is also high, where both of the models are in the same format.

The correlation model storing unit 150 stores individual correlations for a correlation model generated by the correlation model generation unit 130, along with learning reliability models that are generated by the learning reliability model generation unit 190 and added to the individual correlations.

The learning reliability determination unit 195 determines learning reliability using the time series of performance information in the monitoring period and the learning reliability model.

Figure 20:
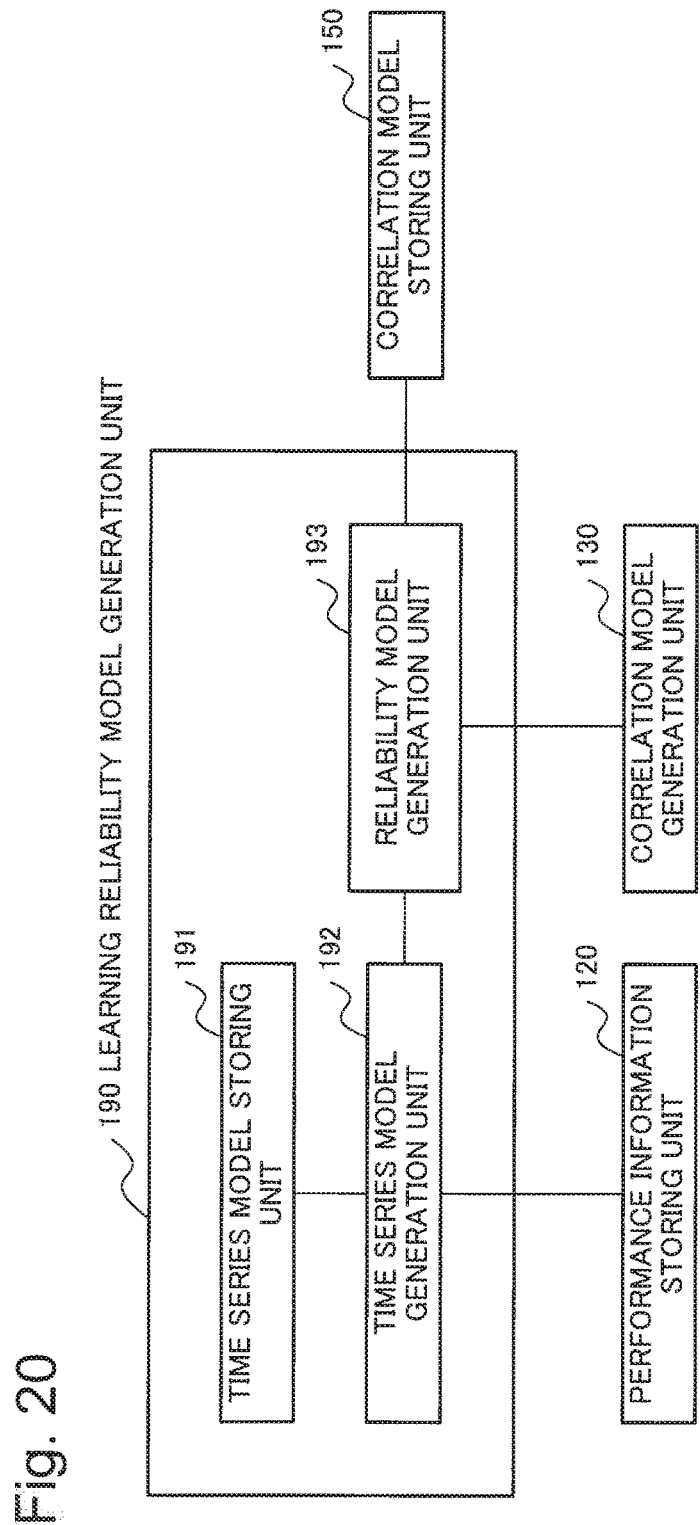
FIG. 20 is a block diagram illustrating a configuration of a learning reliability model generation unit 190 according to the third exemplary embodiment of the present invention.

FIG. 20 is a block diagram illustrating a configuration of the learning reliability model generation unit 190 according to the third exemplary embodiment of the present invention.

With reference to FIG. 20, the learning reliability model generation unit 190 includes a time series model storing unit 191, a time series model generation unit 192, and a reliability model generation unit 193.

The time series model storing unit 191 stores formats of a single time series model.

The time series model generation unit 192 determines parameters of a single time series model in each of the formats stored in the time series model storing unit 191 (i.e., generates a single time series model), based on time series of each metric in a learning period.

The reliability model generation unit 193 generates the above-described learning reliability model, based on the degree of fitness of the single time series model generated by the time series model generation unit 192 with the time series in the learning period.

Figure 21:
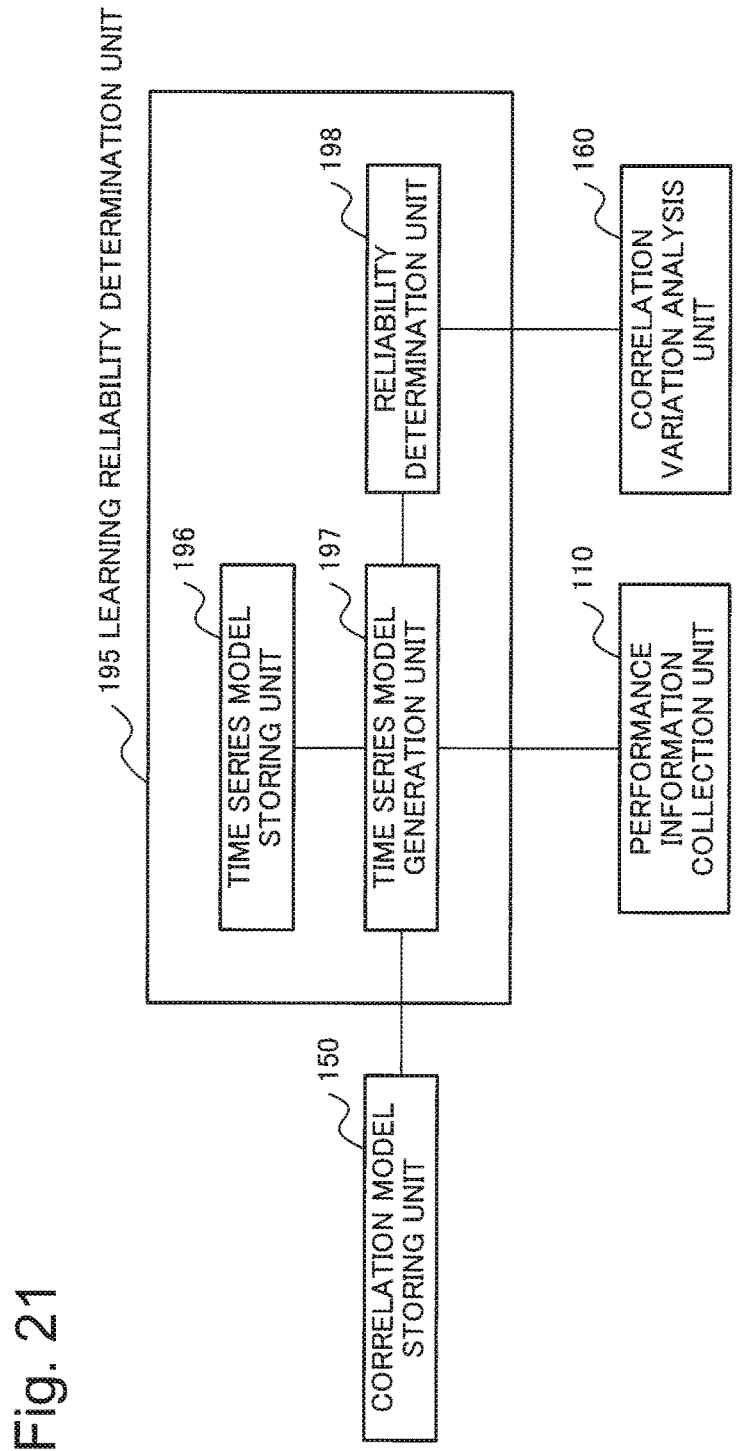
FIG. 21 is a block diagram illustrating a configuration of a learning reliability determination unit 195 according to the third exemplary embodiment of the present invention.

FIG. 21 is a block diagram illustrating a configuration of the learning reliability determination unit 195 according to the third exemplary embodiment of the present invention.

With reference to FIG. 21, the learning reliability determination unit 195 includes a time series model storing unit 196, a time series model generation unit 197, and a reliability determination unit 198.

The time series model storing unit 196 stores formats of a single time series model. The time series model storing unit 196 may store the same formats as those stored in the time series model storing unit 191 or may store other formats.

The time series model generation unit 197 determines parameters of a single time series model in each of the formats stored in the time series model storing unit 196 (i.e., generates a single time series model), based on a time series of each metric in a monitoring period. The time series model generation unit 197 may generate single time series models in the same way as that in the time series model generation unit 192 or in a different way.

The reliability determination unit 198 determines the learning reliability using the degree of fitness of the single time series model generated by the time series model generation unit 197 with the time series in the monitoring period and the learning reliability model.

The operation of the system analysis device 100 according to the third exemplary embodiment of the present invention will be described.

Figure 22:
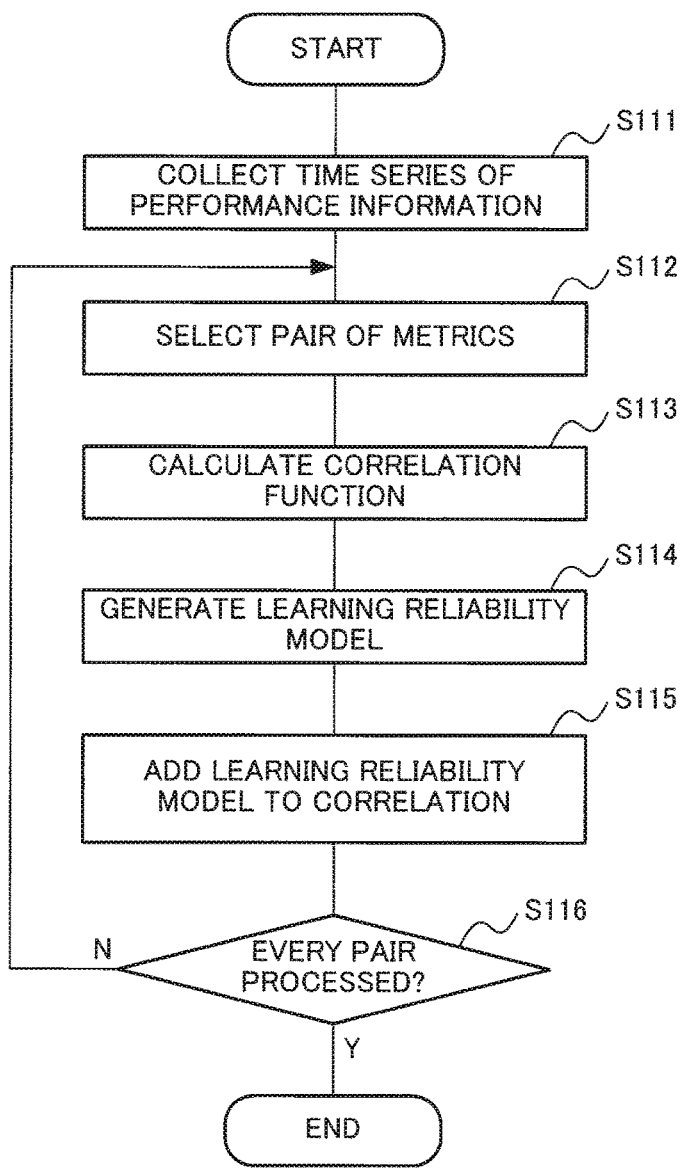
FIG. 22 is a flow chart illustrating details of the correlation model generation process (Step S100) according to the third exemplary embodiment of the present invention.

FIG. 22 is a flow chart illustrating details of the correlation model generation process (Step S100) according to the third exemplary embodiment of the present invention.

The processes from collecting a time series of performance information performed by the performance information collection unit 110 to calculating a correlation function performed by the correlation model generation unit 130 (Steps S111 to S113) are the same as those in the first exemplary embodiment of the present invention (Steps S101 to S103).

The learning reliability model generation unit 190 generates a learning reliability model for a correlation (Step S114). In this step, the time series model generation unit 192 in the learning reliability model generation unit 190 generates a single time series model for each of the formats stored in the time series model storing unit 191, with respect to time series of each metric relevant to a correlation in the learning period. The reliability model generation unit 193 calculates prediction errors of the generated respective single time series models for the time series in the learning period, and then generates the learning reliability model with respect to the single time series model having a small prediction error (a high degree of fitness).

FIG. 24 is a diagram illustrating an example of a correlation model according to the third exemplary embodiment of the present invention.

For example, the learning reliability model generation unit 190 generates a single time series model as illustrated in FIG. 12 for each of metrics A and B in the time series shown in FIG. 9. Then, with respect to the linear model, which has a small prediction error (i.e., zero), the learning reliability model generation unit 190 generates a learning reliability model as illustrated in FIG. 24.

The learning reliability model generation unit 190 adds the learning reliability model to the correlation, and stores them into the correlation model storing unit 150 (Step S115).

For example, the learning reliability model generation unit 190 adds the learning reliability model to the correlation between metrics A and B as illustrated in FIG. 24, and stores them.

Subsequently, Steps S112 to S115 are repeated for every pair of metrics (Step S116).

Figure 23:
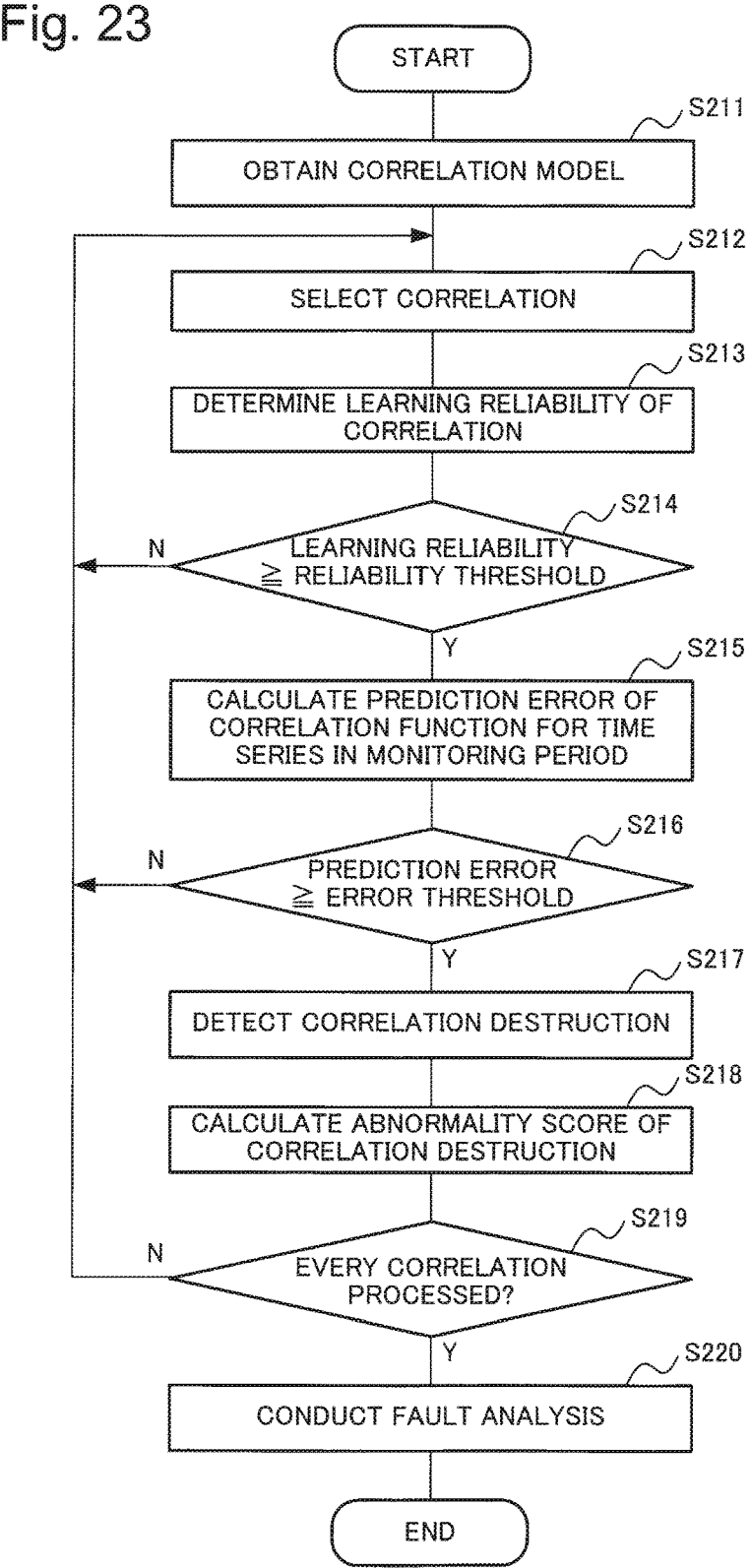
FIG. 23 is a flow chart illustrating details of the correlation variation analysis process (Step S200) according to the third exemplary embodiment of the present invention.

FIG. 23 is a flow chart illustrating details of the correlation variation analysis process (Step S200) according to the third exemplary embodiment of the present invention.

First, the correlation variation analysis unit 160 obtains the correlation model to which learning reliability models have been added, from the correlation model storing unit 150 (Step S211). The learning reliability determination unit 195 selects one of the correlations included in the correlation model (Step S212).

The learning reliability determination unit 195 determines learning reliability of the selected correlation (Step S213). In this step, the time series model generation unit 197 in the learning reliability determination unit 195 generates a single time series model for each of the formats stored in the time series model storing unit 196, with respect to a time series of each metric relevant to a correlation in a monitoring period. The reliability determination unit 198 calculates prediction errors of the generated respective single time series models for the time series in the monitoring period. The reliability determination unit 198 determines the learning reliability using the prediction errors of the respective single time series models and the learning reliability model added to the correlation.

For example, the reliability determination unit 198 calculates learning reliability with respect to the correlation between metrics A and B, by using the learning reliability model illustrated in FIG. 24. In this step, if the prediction error of the linear model for the time series in the monitoring period with respect to both metrics A and B is zero, the reliability determination unit 198 sets the learning reliability to "1" according to the learning reliability model. Or, if the prediction error of the linear model for the time series in the monitoring period with respect to either metric A or B is zero, the reliability determination unit 198 sets the learning reliability to "0.5". Otherwise, the reliability determination unit 198 sets the learning reliability to "0".

If the learning reliability is equal to or more than a reliability threshold (Y in Step S214), the correlation variation analysis unit 160 detects correlation destruction (Steps S215 to S218) as with the first exemplary embodiment of the present invention (Steps S204 to S207). Then, Steps S212 to S218 are repeated for every correlation included in the correlation model (Step S219).

Finally, the fault analysis unit 180 conducts a fault analysis (Step S220) as with the first exemplary embodiment of the present invention (Step S220).

By carrying out the above, the operation according to the third exemplary embodiment of the present invention is completed.

According to the third exemplary embodiment of the present invention, more accurate calculation of learning reliability than the first exemplary embodiment is achieved. This is because the learning reliability calculation unit 140 calculates learning reliability based on a degree of fitness of a single time series model with a time series of each metric relevant to a correlation in a learning period and a degree of fitness of the single time series model with a time series of each metric relevant to the correlation in a monitoring period.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

For example, in an exemplary embodiment of the present invention, a correlation is represented by a correlation function between metrics. However, the correlation may be represented by a correlation coefficient between metrics. In this case, the correlation model generation unit 130 detects, for example, a correlation between any two metrics whose correlation coefficient in a learning period is equal to or more than a predetermined threshold. The learning reliability calculation unit 140 calculates the learning reliability of the detected correlation. The correlation variation analysis unit 160 then determines that an abnormality has occurred in the system if, for example, the correlation coefficient in a monitoring period is less than a predetermined threshold with respect to a correlation whose learning reliability is equal to or more than a predetermined threshold.

This application is based upon and claims the benefit of priority from Japanese Patent Application No. 2014-101948, filed on May 16, 2014, the disclosure of which is incorporated herein in its entirety by reference.

REFERENCE SIGNS LIST

100 System analysis device
101 CPU
102 Storing means
103 Communication means
104 Input means
105 Output means
110 Performance information collection unit
120 Performance information storing unit
130 Correlation model generation unit
140 Learning reliability calculation unit
141 Time series model storing unit
142 Time series model generation unit
143 Prediction error calculation unit
144 Reliability calculation unit
150 Correlation model storing unit
160 Correlation variation analysis unit
170 Analysis setting storing unit
180 Fault analysis unit
190 Learning reliability model generation unit
191 Time series model storing unit
192 Time series model generation unit
193 Reliability model generation unit
195 Learning reliability determination unit
196 Time series model storing unit
197 Time series model generation unit
198 Reliability determination unit
500 Monitored system

What is claimed is:

1. A system analysis device comprising:
a memory storing instructions; and
one or more processors configured to execute the instructions to:
generate, based on time series of a plurality of metrics in a system in a learning period, a correlation model that includes a correlation between metrics;
calculate learning reliability of the correlation, based on a behavior of a time series of each of metrics relevant to the correlation included in the correlation model, in the learning period;
detect, by using the correlation whose learning reliability is equal to or more than a predetermined reliability threshold, correlation destruction between metrics relevant to the correlation;
perform a fault analysis based on the detected correlation destruction; and
output a result of the fault analysis.

2. The system analysis device according to claim 1, wherein
the one or more processors configured to execute the instructions to: calculate the learning reliability of the correlation, based on a degree of fitness of a time series model in a predetermined format with the time series of each of metrics relevant to the correlation in the learning period.

3. The system analysis device according to claim 2, wherein
the degree of fitness is calculated based on a prediction error for the time series in the learning period, the prediction error being obtained by the time series model in the predetermined format generated for the time series of the metric in the learning period.

4. The system analysis device according to claim 3, wherein
the one or more processors configured to execute the instructions to: determine the learning reliability of the correlation, by calculating the sum of prediction errors each of which is the smallest of prediction errors calculated for each of metrics relevant to the correlation, the prediction errors respectively being obtained by one or more time series models in the predetermined formats.

5. The system analysis device according to claim 2, wherein
the one or more processors configured to further execute the instructions to: divide, in the direction of time, the time series of each of metrics relevant to the correlation in the learning period into segments, and calculate the learning reliability based on a degree of fitness of the time series model in the predetermined format with each of the segments.

6. The system analysis device according to claim 2, wherein
the one or more processors configured to execute the instructions to: calculate the learning reliability, based on a degree of fitness of the time series model in the predetermined format with the time series of each of metrics relevant to the correlation in the learning period and a degree of fitness of the time series model in the predetermined format with a time series of each of metrics relevant to the correlation in a monitoring period.

7. The system analysis device according to claim 2, wherein
the time series model in the predetermined format is any one of a model of a time series representing a constant value, a model representing either of two values, and a model representing a linear change.

8. The system analysis device according to claim 1, wherein
the one or more processors configured to further execute the instructions to:
handle a fault on the system when an indication is inputted in response to outputting the result of the fault analysis.

9. An analysis method comprising:
generating, based on time series of a plurality of metrics in a system in a learning period, a correlation model that includes a correlation between metrics;
calculating learning reliability of the correlation, based on a behavior of a time series of each of metrics relevant to the correlation included in the correlation model, in the learning period;
detecting, by using the correlation whose learning reliability is equal to or more than a predetermined reliability threshold, correlation destruction between metrics relevant to the correlation;
performing a fault analysis based on the detected correlation destruction; and
outputting a result of the fault analysis.

10. The analysis method according to claim 9, further comprising:
handling a fault on the system when an indication is inputted in response to outputting the result of the fault analysis.

11. A non-transitory computer readable storage medium recording thereon a program, causing a computer to perform a method comprising:
generating, based on time series of a plurality of metrics in a system in a learning period, a correlation model that includes a correlation between metrics; and
calculating learning reliability of the correlation, based on a behavior of a time series of each of metrics relevant to the correlation included in the correlation model, in the learning period;
detecting, by using the correlation whose learning reliability is equal to or more than a predetermined reliability threshold, correlation destruction between metrics relevant to the correlation;
performing a fault analysis based on the detected correlation destruction; and
outputting a result of the fault analysis.

12. The non-transitory computer readable storage medium recording thereon the program according to claim 11, causing the computer to perform the method further comprising:
handling a fault on the system when an indication is inputted in response to outputting the result of the fault analysis.

* * * * *